United States Patent [19]
Bohannon et al.

[11] Patent Number: 5,864,849
[45] Date of Patent: Jan. 26, 1999

[54] SYSTEM AND METHOD FOR RESTORING A MULTIPLE CHECKPOINTED DATABASE IN VIEW OF LOSS OF VOLATILE MEMORY

[75] Inventors: Philip Lewis Bohannon, Mt. Tabor; Rajeev Rastogi, New Providence; Abraham Silberschatz, Summit, all of N.J.; Sundararajarao Sudarshan, Powai, India

[73] Assignee: Lucent Technologies Inc., Murray Hill, N.J.

[21] Appl. No.: 767,048

[22] Filed: Dec. 16, 1996

[51] Int. Cl.$^6$ ..................................................... G06F 17/30
[52] U.S. Cl. .................................. 707/8; 707/7; 707/201; 707/202
[58] Field of Search ..................... 395/182.14, 182.18, 395/182.13, 182.17, 180; 707/201, 202, 8, 7.8, 204

[56] References Cited

U.S. PATENT DOCUMENTS

| | | | |
|---|---|---|---|
| 5,465,328 | 11/1995 | Dievendorff | 395/182.13 |
| 5,469,562 | 11/1995 | Saether | 395/182.18 |
| 5,481,699 | 1/1996 | Saether | 395/182.18 |
| 5,592,661 | 1/1997 | Eisenberg et al. | 707/104 |

*Primary Examiner*—Thomas G. Black
*Assistant Examiner*—Diane D. Mizrahi

[57] ABSTRACT

For use with an active database stored in volatile memory for direct revision thereof, the active database having multiple checkpoints and a stable log, having a tail stored in the volatile memory, for tracking revisions to the active database to allow corresponding revisions to be made to the multiple checkpoints, the active database subject to corruption, a system for, and method of, restoring the active database and a computer system containing the same. The system includes: (1) a checkpoint determination controller that determines which of the multiple checkpoints is a most recently completed checkpoint and copies the most recently completed checkpoint to the volatile memory to serve as an unrevised database for reconstructing the active database and (2) a revision application controller that retrieves selected ones of the revisions from the stable log and the tail and applies the revisions to the unrevised database thereby to restore the active database. In an advantageous embodiment, the applied revisions include log records at an operation level (lower level of abstraction than transactions), and the revision application controller, using memory locks while restoring the active database, releases ones of the memory locks as a function of applying ones of the log records.

29 Claims, 8 Drawing Sheets

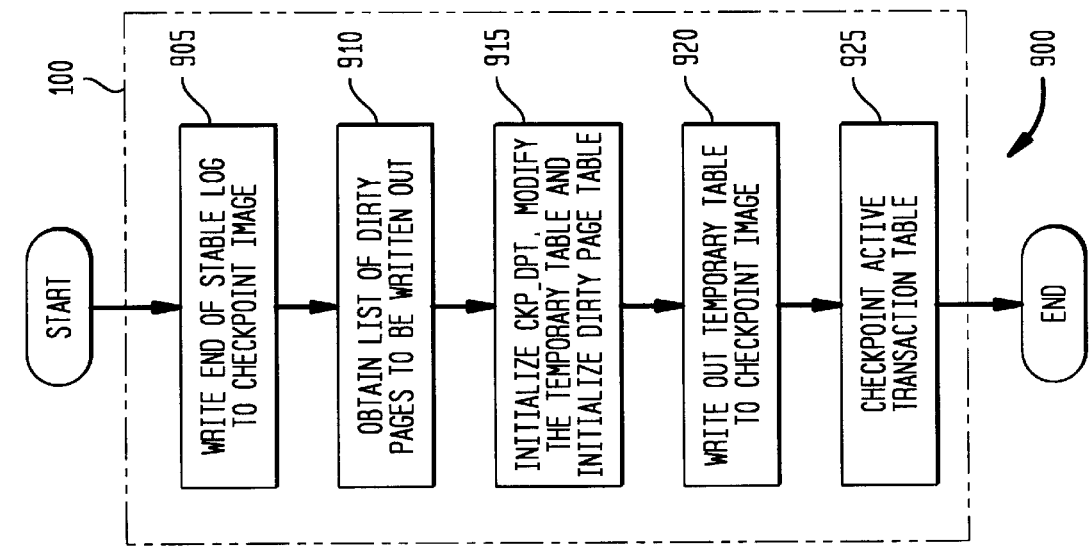
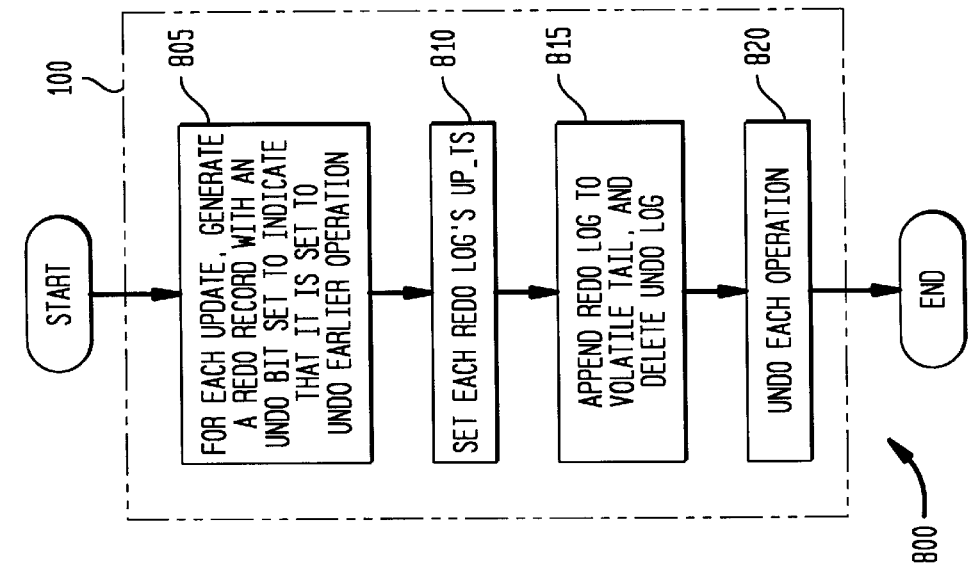

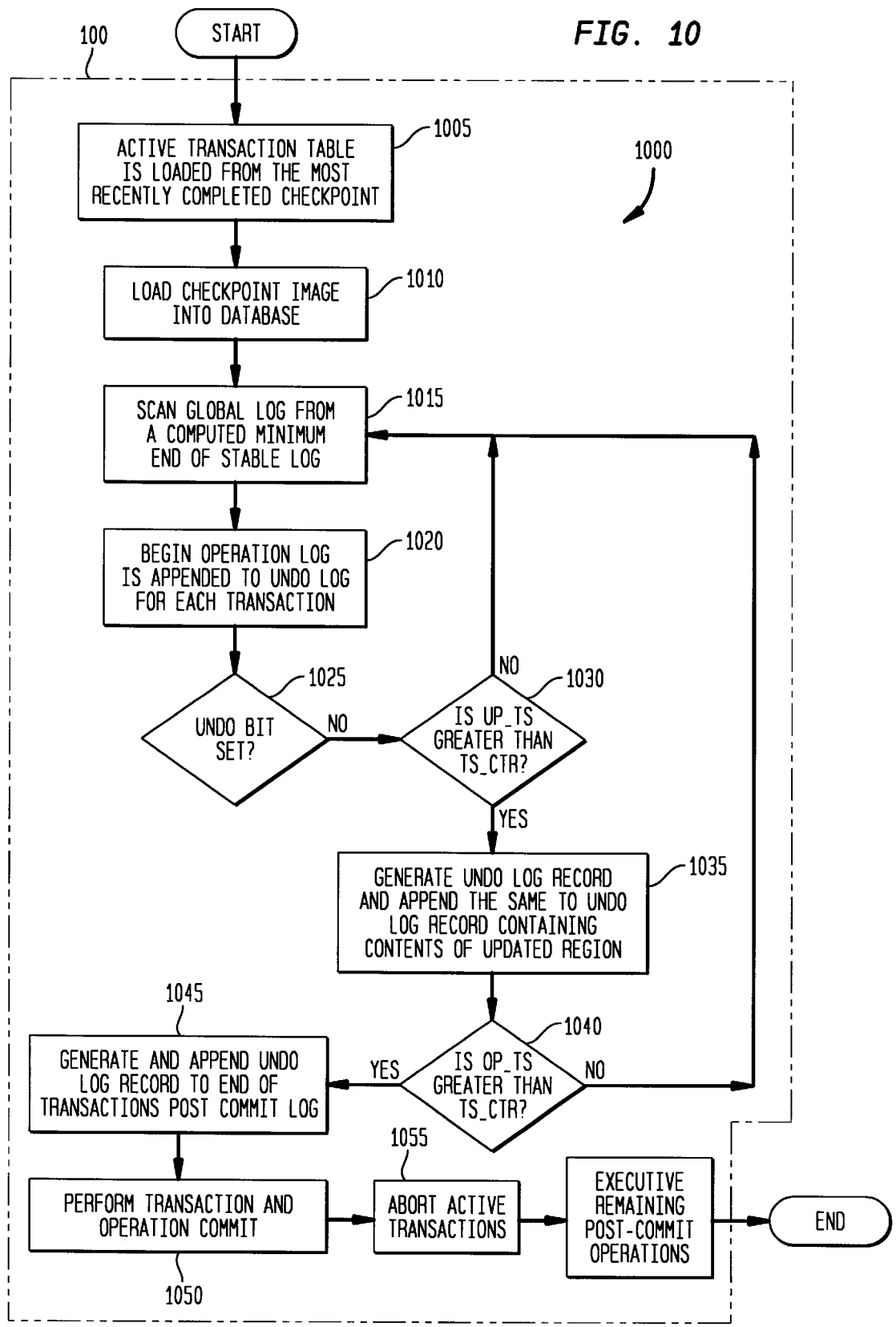

SYSTEM AND METHOD FOR RESTORING A MULTIPLE CHECKPOINTED DATABASE IN VIEW OF LOSS OF VOLATILE MEMORY

CROSS-REFERENCE

The present invention is related to that disclosed in U.S. patent pending application Ser. No. 08/766,096, filed concurrently herewith on Dec. 16, 1996, entitled "SYSTEM AND METHOD FOR RESTORING A DISTRIBUTED CHECKPOINTED DATABASE," which is commonly assigned with the present invention and incorporated herein by reference for all purposes.

TECHNICAL FIELD OF THE INVENTION

The present invention is directed, in general, to database management systems ("DBMS") and, more specifically, to a system and method for restoring a main memory database having multiple checkpoints after the database has been corrupted.

BACKGROUND OF THE INVENTION

A database is a collection of data organized usefully and fundamental to some software application (e.g., an information management system). The database is associated with a database manager ("DBM"), which itself is software-based and performs a range of tasks on the database, usually for the software application, the range of tasks varying largely upon the intended use of the database and the sophistication of the DBM.

Traditionally, databases have been stored in non-volatile (disk) memory, while DBMs and software applications have resided, at least in pertinent part, in volatile (main) memory. DBMs have been distinguished by the manner in which they process and manipulate the data with which they are charged. For example, some DBMs only manipulate one data file at a time (flat-file DBMS), others process multiple data files at one time, associating data from several different data files (relational DBMs).

Fundamental DBM operations include storing data, creating indexes that allow retrieval of data, linking data from different files (relational DBMS), etc. Two of the most important operations, and hence most sophisticated, performed by DBMs are data integrity and database recovery.

Data integrity, very simply, insures that one software application cannot modify a particular data file while another software application is relying upon the contents of the same. Database recovery, on the other hand, involves rebuilding the database after part or all of its data is corrupted—data corruption may be caused by a power outage, a program crash or the like that causes the DBM to suspect that at least part of the data stored therein has been lost or damaged.

Today, many software applications require high performance access to data with response time requirements on the order of a few to tens of milliseconds. Traditional non-volatile (disk) memory DBMs have been largely incapable of meeting the high performance needs of such applications (often due to the latency of accessing data that is non-volatile memory-resident).

In an effort to improve performance, one approach provides a large buffer (volatile memory-resident) for loading a portion of the database therein for faster access. A fundamental problem arises however when a conventional disk-based architecture is adopted to implement such a system. Most disk-based architectures have a buffer manager. Page requests result in searching the memory buffer to see if the requested page is already resident there. Thus, even if a page were cached in the memory buffer, access to data on the page requires locating the page and "pinning" it in the buffer. These transactions tend to substantially increase processing overhead.

Another approach maps the entire database directly into volatile (main) memory. The data may be accessed either directly by virtual memory pointers, or indirectly via location independent database offsets that quickly translate into memory addresses (therefore, no need for data requests to interact with a buffer manager, either for locating data, or for fetching/pinning buffer pages). Data access using a main-memory database is much faster than disk-based storage managers—pages need not be written to disk during normal processing to make space for other pages.

A significant danger exists however if a portion or all of the main memory database becomes corrupted then, unlike non-volatile (disk) memory databases, the entire database may need to be recovered. One recovery approach uses undo log records that are used to track the progress of transactions that have modified the database in some manner. Traditional recovery schemes implement write-ahead logging ("WAL"), whereby all undo logs for updates on a page are "flushed" to disk before the page is flushed to disk. To guarantee (trueness) the WAL property and, hence, the recovery method, a latch is held on the page (or possibly on some system log) while the page is copied to disk, and, thus, reintroducing disk memory processing costs as such latching tends to significantly increase access costs to non-volatile memory, increase programming complexity, and interfere with normal processing.

What is needed in the art is a way of restoring a corrupted volatile memory database that does not significantly increase processing costs, such as those costs associated with conventional recovery methods. What is further needed is a recovery scheme that substantially reduces the duration of latches on pages during updates.

SUMMARY OF THE INVENTION

The present invention introduces the broad concept of providing an active database stored in volatile memory that can be revised quickly, but that is recoverable should it become corrupted (possibly by virtue of being stored in the volatile memory). "Corrupted," as used herein, is defined as being damaged or, at an extreme, lost in its entirety. "Or," as used herein, is inclusive, meaning and/or. The present invention provides a system for, and method of, restoring an active database and a computer system containing the same. The present invention is used with the active database which has multiple checkpoints and a stable log. The stable log having a tail stored in the volatile memory for tracking revisions to the active database to allow corresponding revisions to be made to the multiple checkpoints, as the active database is subject to corruption.

An exemplary system includes: (1) a checkpoint determination controller that determines which of the multiple checkpoints is a most recently completed checkpoint and copies the most recently completed checkpoint to the volatile memory to serve as an unrevised database for reconstructing the active database and (2) a revision application controller that retrieves selected ones of the revisions from the stable log and the tail and applies the revisions to the unrevised database (multi-level recovery) thereby to restore the active database. "Include" and derivatives thereof, as used herein, means inclusion without limitation, and "controller," as used herein, may be suitably hardware-, firmware-or software-based, or may include suitable combinations of the same.

The present invention uniquely employs multiple checkpoints, a stable log (having a volatile tail) and multi-level transactions/operations to accomplish the heretofore inconsistent characteristics of quick revision and reliable recoverability. According to an advantageous embodiment of the present invention, the active database and the multiple checkpoints each contain an active transaction table, the checkpoint determination controller copying the active transaction table from the most recently completed checkpoint to the volatile memory during recovery. The active transaction table may suitably define a state of transactions (correlating to revisions) that are to be made, are in the process of being made or have been made to the active database. The active transaction table provides a guide to the revision application controller as to how to reconstruct the active database.

A "transaction" means any sequence of operations, and an "operation" means any sequence of actions at lower levels of abstraction than transactions—each operation typically having a level, Li, associated therewith such that an operation at Li may consist of a sequence of operations at a lower level, Li-1 (transactions, assumed to be at Ln, call operations at Level Ln-1 (commonly, physical updates to regions are Lo operations)). According to an advantageous embodiment, the applied revisions include one or more log records at an operation level (representing at least one transaction)and the revision application controller, using memory locks while restoring the active database, releases ones of the memory locks as a function of applying ones of the log records, thereby achieving multi-level recovery. The present invention therefore allows the release of memory locks at the end of an operation (operation commit) rather than at the end of an transaction (transaction commit).

In one embodiment of the present invention, the stable log and the tail cooperate to form a global log, the revision application controller applying the revisions as a function of a temporal pointer associated with the global log. The temporal pointer provides a high-resolution indication of which of the revisions had been applied to the unrevised database. In a related embodiment of the present invention, the revision application controller retrieves revisions from the stable log and the tail that were not made to the most recently completed checkpoint.

In one embodiment of the present invention, the multiple checkpoints and the stable log are stored on a nonvolatile storage device. Of course, the checkpoints may be stored in separate volatile memory. The important concept in this embodiment is that the multiple checkpoints should be stored in a location that is separate from the active database itself, such that if the active database becomes corrupt, the multiple checkpoints remain true.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, wherein like numbers designate like objects, and in which:

FIG. 8 illustrates a flow diagram of an exemplary method of operating the computers of FIGS. 1 through 3 that includes an abort procedure according to the present invention;

FIG. 9 illustrates a flow diagram of an exemplary method of operating the computers of FIGS. 1 through 3 to perform a checkpointing procedure according to the present invention;

FIG. 10 illustrates a flow diagram of an exemplary method of operating the computers of FIGS. 1 through 3 to perform a database recovery procedure according to the present invention.

DETAILED DESCRIPTION

Figure 1:
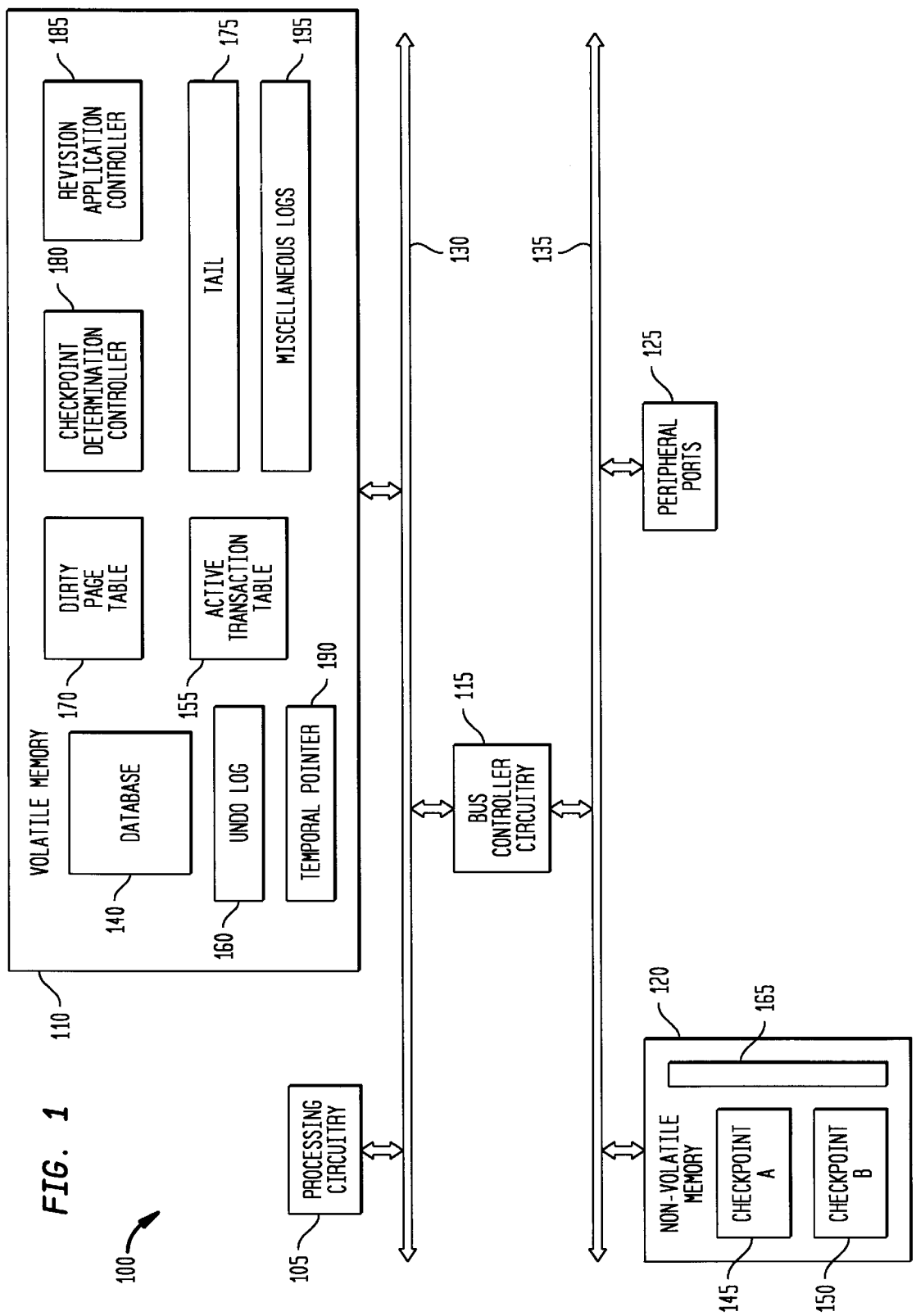
FIG. 1 illustrates a block diagram of an exemplary computer which provides a suitable environment within which the principles of the present invention may be implemented and operated.

Referring initially to FIG. 1, illustrated is a block diagram of an exemplary computer (generally designated 100) that may provide a suitable environment within which the principles of the present invention may be implemented and operated. Since the present invention is not limited to application in any particular processing environment, FIG. 1 is illustrative only. More over, the principles of the present invention are usable in processing environments other than computer systems, such as data communication (e.g., wired and wireless public and private communication networks) and multimedia networks.

Exemplary computer 100 illustratively includes processing circuitry 105 (e.g., at least one conventional processor), conventional volatile memory (e.g., random access memory) 110, bus controller circuitry 115, a non-volatile memory (e.g., a hard disk drive) 120 and a set of peripheral ports 125. Computer 100 further includes a host bus 130 and an input/output ("I/O") bus 135. Exemplary host bus 130 is suitably operative to associate processing circuitry 105, volatile memory 110 and bus controller circuitry 115, while exemplary I/O bus 135 is suitably operative to associate bus controller circuitry 115, non-volatile memory 120 and the set of peripheral ports 125. The exemplary set of peripheral ports 125 may suitably couple I/O bus 135 to any one or more of a plurality of conventional peripheral devices for communication therewith. One or more serial or parallel ports may be suitably associated with the set of peripheral ports 125. "Associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like.

It should be noted that while the present embodiment shows a dual bus configuration, those skilled in the art understand that this is also illustrative only—computer 100 may be associated with any suitable single bus configuration or, alternatively, any suitable three or more bus configuration.

Exemplary volatile memory 110 illustratively includes an active database 140, an active transaction table 155, an undo log 160, a dirty page table 170, a volatile tail 175, a checkpoint determination controller 180, a revision application controller 185, a temporal pointer 190 and one or more miscellaneous logs 195. Storage of active database 140 in volatile memory 110 allows for direct revision thereof by suitable application programs (not shown) executing in processing circuitry 105. The term "database," as used herein, may mean any data bank, data repository or like collection of data files (defined broadly to include any combination of data or records) arranged, for example, for ease and speed of search and retrieval. Exemplary non-volatile memory 120 illustratively includes two exemplary checkpoints 145, 150 of database 140, and a stable log 165.

The term "checkpoint," as used herein, may mean any copy of database 140 stored apart therefrom (e.g., database 140 stored in volatile, or main, memory 110 with a copy, or checkpoint, of database 140 stored in non-volatile, or disk, memory 120); the term "checkpointing," as used herein, may mean any suitable process of creating a checkpoint; and term "log," as used herein, may be any suitable data structure, such as a queue, stack, array, matrix or the like. The general concept and use of checkpointing, as well as dirty page and transaction tables, in database design and implementation are known.

Exemplary multiple checkpoints 145, 150 may be advantageously checkpointed alternately—a first checkpoint is first created and revisions thereto tracked, then a second checkpoint is created at a later time and revisions thereto also tracked. If only two checkpoints are used, as is the case with the illustrated embodiment, the first checkpoint is then checkpointed again at a later time and revisions thereto tracked. Those skilled in the art sometimes refer to this alternating checkpointing process as "ping ponging."

Exemplary active transaction table 155 operates to define the state of transactions—correlating to revisions—that are to be made, are in the process of being made or have been made to active database 140. According to an advantageous embodiment to be described hereinafter, each of multiple checkpoints 145 and 150 contain an active transaction table. Exemplary undo log 160 operates to track revisions to be undone in active database 140—revisions to active database 140 may be both done and undone, undo log 160 allows undoing of revisions (or transactions (one or more operations)). Exemplary stable log 165 operates to contain an indication of an extent to which revisions are committed to multiple checkpoints 145, 150. Miscellaneous logs 195 are associated with database 140 and may conceptually include any other suitable log (additional advantageous logs are set forth below), in alternate embodiments logs 195 may be stored in non-volatile memory 120.

Stable log 165 may be suitably associated with "tail" 175 that is advantageously stored in volatile memory 110—which may be collectively used for tracking revisions to active database 140 to allow corresponding revisions to be made to exemplary multiple checkpoints 145, 150 according to the principles of the present invention. Exemplary stable log 165 and tail 175 may be suitably associated via bus controller circuitry 115 to cooperatively form a virtual global log.

Although exemplary checkpoints 145, 150 and stable log 165 are illustratively stored on nonvolatile memory 120, one or more of the same, at least in part, may be alternatively-suitably stored in volatile memory. Likewise, one or more of active transaction table 155, undo log 160, dirty page table 170, controllers 180, 185 or miscellaneous logs 195, at least in part, may be alternatively-suitably stored in non-volatile memory 120. The important aspect of all such embodiments is that the multiple checkpoints be stored in a location that is separate from active database 140 itself, such that if active database 140 becomes corrupt, the one or more checkpoints 145, 150 remain true (not corrupt).

Exemplary bus controller circuitry 115 provides a suitable means by which host bus 130 and I/O bus 135 may be associated, thereby providing a path and management for communication therebetween. Each of the illustrated buses 130 and 135 requires a drive current to carry signals thereon. The illustrative circuitry accordingly operates in conjunction with a conventional system controller (not shown) that supplies the required drive current.

According to the illustrated embodiment, active database 140 is subject to corruption and the illustrated system is broadly operative to restore active database 140. Computer 100 accordingly includes each of checkpoint determination controller 180 and revision application controller 185 that are illustratively stored in volatile memory 110—each exemplary controller is software-based and therefore executable by processing circuitry 105, advantageously in association with a suitable operating system (not shown).

Upon a determination or indication that database 140 is corrupted (requiring recovery), exemplary checkpoint determination controller 180 operates to determine which of multiple checkpoints 145, 150 is a most recently completed checkpoint and copies the same to volatile memory 110 to serve as an unrevised database for reconstructing active database 140. Advantageously, checkpoint determination controller 180 also copies a checkpoint transaction table 155 contained within the most recently completed checkpoint to active transaction table 155 in volatile memory 110. Active transaction table 155 provides a guide to revision application controller 185 as to how to reconstruct active database 140.

Exemplary revision application controller 185 operates to retrieve selected ones of the revisions from stable log 165 and tail 175 and apply the revisions to the unrevised database thereby to restore active database 140. Revision application controller 185 retrieves revisions from stable log 165 and tail 175 that were not made to the most recently completed checkpoint.

During normal processing, database 140 is revised (modified, changed or altered) through transactions (a "transaction" being any sequence of operations, and an "operations" being any sequence of actions at lower levels of abstraction than transactions). According to an advantageous embodiment, the applied revisions include one or more log records at an operation level (representing at least one transaction); revision application controller 185, using memory locks while restoring active database 140, releases ones of the memory locks as a function of applying ones of the log records to thereby achieve multi-level recovery according to the present invention. The present invention therefore allows the release of memory locks at the end of an operation (operation commit) rather than at the end of an transaction (transaction commit).

Advantageously, revision application controller 185 applies the revisions as a function of temporal pointer 190 associated with the global log—temporal pointer 190 provides a high-resolution indication of which of the revisions had been applied to the unrevised database. Revision application controller 185 then may retrieve selected ones of the revisions as a function of a content of undo log 160.

As will be discussed in more detail with respect to an advantageous embodiment illustrated in FIGS. 3 to 10, active database 140 is revisable quickly because it is stored in volatile memory 110, and is recoverable should it become corrupted (by virtue of being stored in the volatile memory) by employing multiple checkpoints 145, 150, stable log 165 having volatile tail 175 and multi-level transactions/operations (described in greater detail hereinafter) to accomplish the heretofore inconsistent characteristics of quick revision and reliable recoverability.

In alternate advantageous embodiments, exemplary checkpoint determination controller 180 and revision application controller 185 may be suitably implemented in firmware or hardware, or in some combination of at least two of the three (e.g., software, firmware or hardware). In point of fact, any circuitry described herein may suitably be replaced by or combined with the same, as well as multi, parallel and distributed processing environments and configurations—including, for example, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like—to form the various types of circuitry, controllers and systems described and claimed herein.

Figure 2:
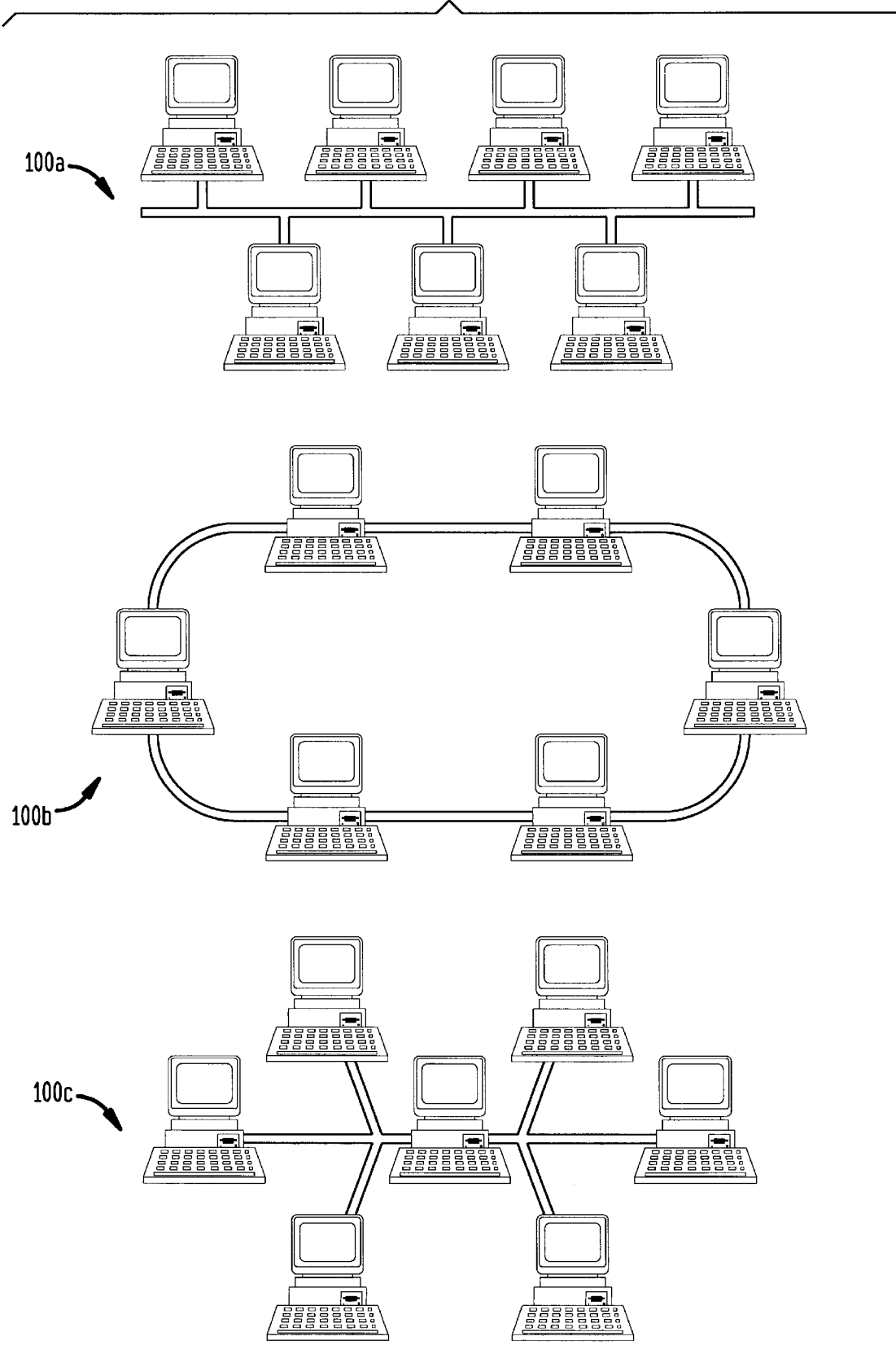
FIG. 2 illustrates block diagrams of three exemplary computer network topologies, each of which may provide a suitable alternate environment within which the principles of the present invention may be implemented and operated.

Turning now to FIG. 2, illustrated are block diagrams of three exemplary computer network topologies 100a, 100b and 100c, each of which may provide a suitable alternate environment to exemplary computer 100 within which the principles of the present invention may be implemented and operated. Exemplary network 100a is a conventional bus topology; Exemplary network 100b is a conventional ring topology; and Exemplary network 100c is a conventional star topology, all of which are well known in the art. FIG. 2, like FIG. 1, is illustrative only as alternate network topologies are also known in the art. The term "computer" and the phrases "computer system" and "computer network," as used herein, are broadly defined and include stand-alone computers (e.g., micro, notebook, personal, mini, main frame, super and like computers) and computer networks, as well as communication networks. The present invention is related to that disclosed in U.S. pending patent application Ser. No. 08/766,096 (Attorney Docket LUCT-111259), filed concurrently herewith on Dec. 16, 1996, entitled "SYSTEM AND METHOD FOR RESTORING A DISTRIBUTED CHECKPOINTED DATABASE," (the "'259 Application") which is commonly assigned with the present invention and incorporated herein by reference for all purposes. The distributed processing environment thereof provides a recovery scheme (applicable, for example, in a client-server environment, a shared-disk scheme, etc.) that permits multiple sites to concurrently update a page and are, thus, especially suitable for high concurrency structures, such as indices.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Figure 3:
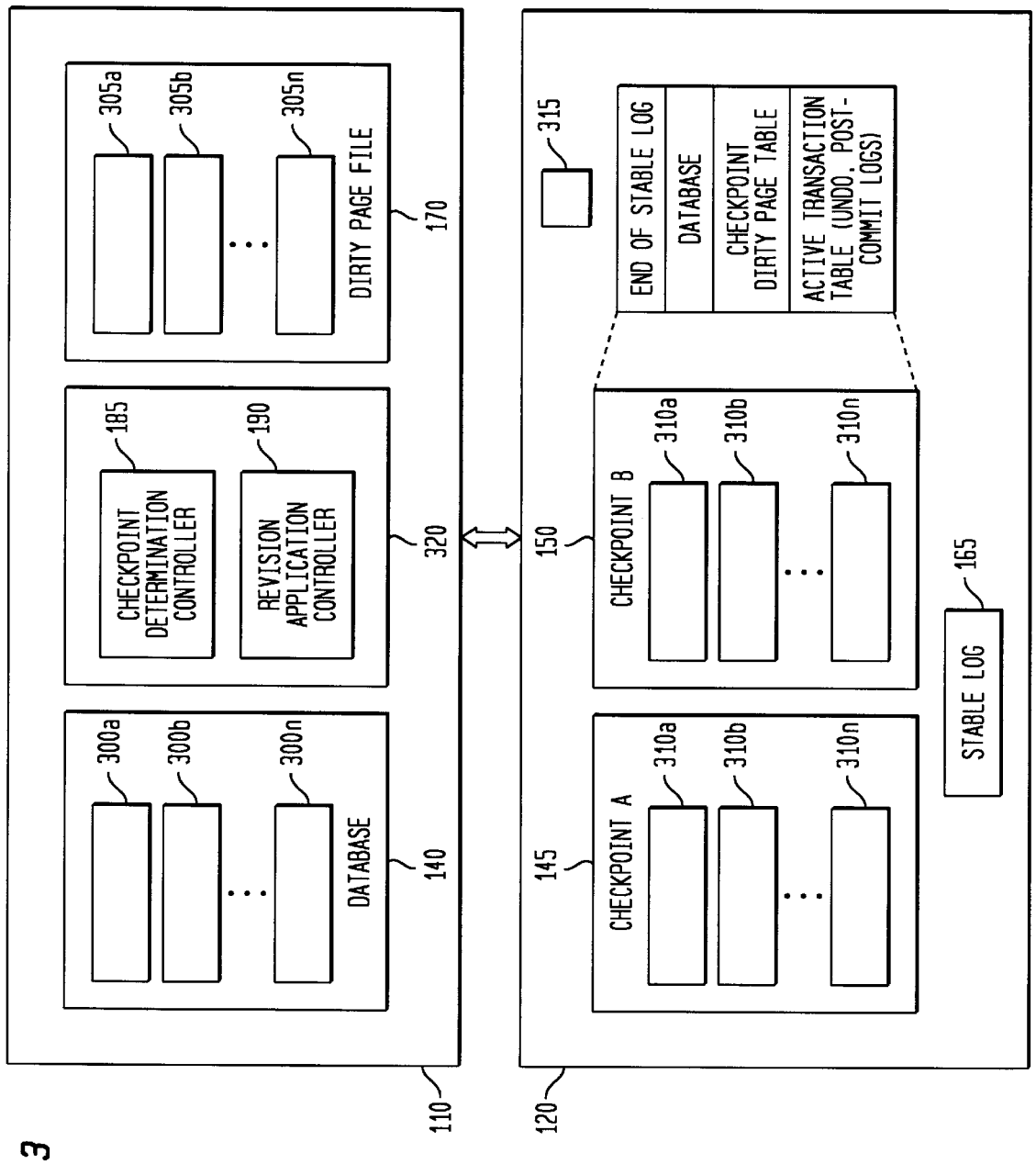
FIG. 3 illustrates a conceptual block diagram of the memory configuration of the exemplary computers of FIGS. 1 and 2, showing a suitable database recovery environment according to the principles of the present invention.

Turning now to FIG. 3, illustrated is a conceptual block diagram of the memory configuration of exemplary computers 100 of FIGS. 1 and 2 illustrating a suitable database recovery environment according to the principles of the present invention. Exemplary volatile memory 110 illustratively includes database 140, active transaction table 155, dirty page table 170, tail 175, and temporal pointer 190. Exemplary database 140 illustratively includes a plurality of database files 300a to 300n; and exemplary dirty page table 170 illustratively includes a plurality of dirty page files 305a to 305n.

Exemplary non-volatile memory 120 illustratively includes stable log 165, two checkpoints 145, 150 and checkpoint indicia 315. According to the illustrated embodiment, for each database file 300a to 300n of active database 140, there is a corresponding check point database file 310a to 310n. Checkpoint indicia (cur_ckpt) 315 indicates which of the two checkpoints 145, 150 is a most recently completed checkpoint according to the present invention. A checkpoint active transaction table (with undo and post commit log records) and a checkpoint dirty page table are illustratively associated with each checkpoint.

According to the illustrated embodiment, dirty page files 305 are maintained for each database file 300, 310, and indicia is maintained that indicates which records/pages of dirty page table 170 have been updated since a "last" checkpoint.

As discussed with reference to FIG. 1, active database 140 is revisable quickly because it is stored in volatile memory 110, and is recoverable should it become corrupted through the employment of multiple checkpoints 145, 150, stable log 165, volatile tail 175 and multi-level transactions/operations to accomplish the heretofore inconsistent characteristics of quick revision and reliable recoverability of main memory databases.

Data and information concerning transactions is stored in active transaction table 155. The illustrated embodiment distinguishes between pre-commit (when the commit record enters the global log (tail 175) in memory establishing a point in the serialization order) and commit (when the commit record enters stable log 165) for transactions, as well as for operations (operation commit). Each transaction advantageously obtains an operation lock before an operation executes (the lock may be suitably granted to the operation if it commutes with other operation locks held by active transactions), and physical level, Lo, operations may obtain region (a tuple, an object, data structure, etc.) locks. A lock on a region may be released once the L1 operation pre-commits; however, an operation lock at Li is held until the transaction or the containing operation (at Li+1) pre-commits. All locks acquired by a transaction are therefore released once the transaction pre-commits.

Figure 4:
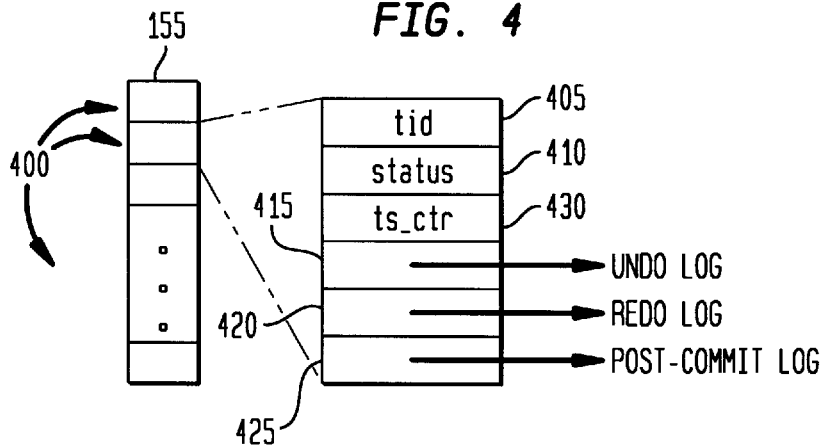
FIG. 4 illustrates a block diagram of an exemplary active transaction table according to the computers of FIGS. 1 through 3 and the principles of the present invention.

Turning momentarily to FIG. 4, illustrated is a block diagram of an exemplary active transaction table 155 according to computers 100 of FIGS. 1 to 3 and the principles of the present invention. Active transaction table 155 illustratively includes an array of transaction entries 400—each entry contains an identifier 405 associated with a transaction ("tid") mapped to the entry; transaction status indicia (e.g., inactive, active, pre-committed, committed, etc.) 410; undo, redo and post-commit pointers 415–425 respectively pointing to each of undo, redo and post-commit logs (undo log 160, miscellaneous logs 195) for the transaction; and a time stamp counter ("ts_ctr") 430 that is used to assign an identifier to updates (referred to as "up_ts" in exemplary log records (or entries), discussed with reference to FIG. 5) and to operations (referred to as "op_ts" in exemplary log records, discussed with reference to FIG. 6).

Accesses/updates to active transaction table 155 entries (e.g., undo or redo logs, or ts_ctr in the entry) may be suitably controlled by latches for each entry. Another latch may control allocation/de-allocation of entries from active transaction table 155. Further, a system log tail latch may be obtained each time log records are appended/disconnected from the system log. Finally, a flush latch may be used to ensure that only a single process can be flushing the global log at any given time.

Figure 5:
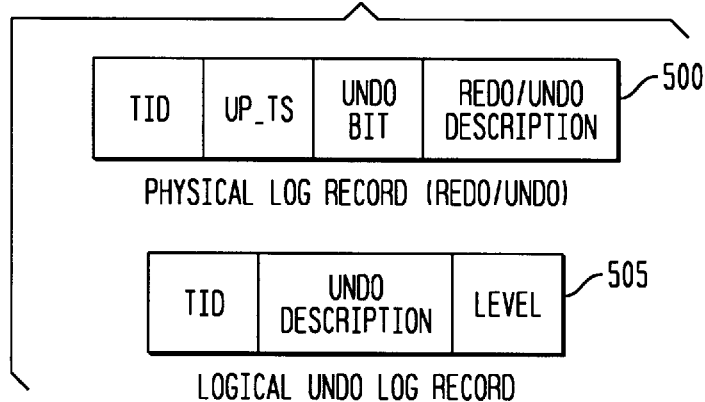
FIG. 5 illustrates a block diagram of an exemplary physical redo log and logical undo redo log records according to the computers of FIGS. 1 through 3 and the principles of the present invention.
Figure 6:
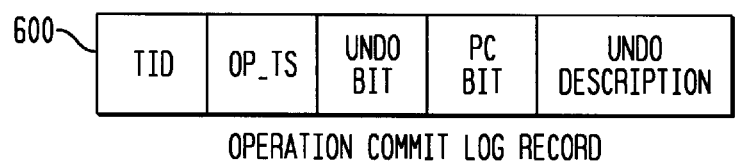
FIG. 6 illustrates a block diagram of an exemplary operation commit log record according to the computers of FIGS. 1 through 3 and the principles of the present invention.

Any of a number of log record types may be suitably employed to ensure atomicity and durability properties of transactions, each with an associated tid, including begin operation, physical, logical undo, commit and post-commit log records. The begin operation log record may be suitably generated when transactions or operations begin and may include an op_ts for a particular operation. The physical log record may be suitably generated by updates (turning momentarily to FIG. 5, illustrated is a block diagram of an exemplary physical log record (generally designated 500) of undo log 160). The logical undo log record may suitably include undo descriptions for operations (also illustrated as a block diagram in FIG. 5 is an exemplary logical undo log record (generally designated 505) of undo log 160). The commit log record may be suitably generated when transactions and operations pre-commit (turning momentarily to FIG. 6, illustrated is a block diagram of an exemplary operation commit log record (generally designated 600)). The post-commit log record may be suitably generated when post-commit operations are registered and include a description for the operation.

According to an advantageous embodiment, commit log records may include an undo bit, used to distinguish records generated during normal updates/pre-commits from those generated when an update/operation is rolled back, and a post-commit ("pc") bit, used to distinguish commit records of normal operations from those generated for post-commit operations. Note that neither operation commit log records for which either the undo or pc bit is set, nor transaction commit log records may contain undo descriptions or level information; these may be contained in normal operation commit log records only.

At certain times (e.g., operation precommit and transaction precommit) the contents of transaction redo log 500 may be moved to volatile tail 175 in memory 110. The contents of volatile tail 175 may then be suitably flushed to stable log 165 of non-volatile memory 120 (e.g., during transaction commit). As set forth hereinabove, stable log 165 and tail 175 may cooperatively form a global log, the variable end of stable log 165 being suitably stored in temporal pointer 190 such that all records prior to that indicated by temporal pointer 190 have been flushed to stable log 165 in non-volatile memory 120.

Returning now to FIG. 3, a main-memory manager 320, that includes exemplary checkpoint determination and revision application controllers 180, 185, accesses data directly from database 140 after the same is mapped into volatile memory 110 (database 140 at least substantially fits in shared main-memory— data may be suitably accessed either directly by virtual memory pointers, indirectly via location independent database offsets, or the like).

Those skilled in the art will note that the principles of the present invention differ from conventional multi-level logging schemes in several ways. First, exemplary embodiments of the present invention may use transient undo logging (keeping undo records in volatile memory 110 and not writing the same out to non-volatile memory unless required for checkpointing) which reduces non-volatile memory input/output. Second, such embodiments may reduce contention on the global log by buffering redo log records for a transaction within a local redo log and appending the same to the global log on the occurrence of certain events (e.g., operation commit (completion)). Third, such embodiments may support post-commit actions. Fourth, such embodiments may not require latching of pages during updates, which may be expensive (actions that are taken on page latching, such as setting of dirty bits, are efficiently performed based on physical redo log records written to the global log).

Figure 7:
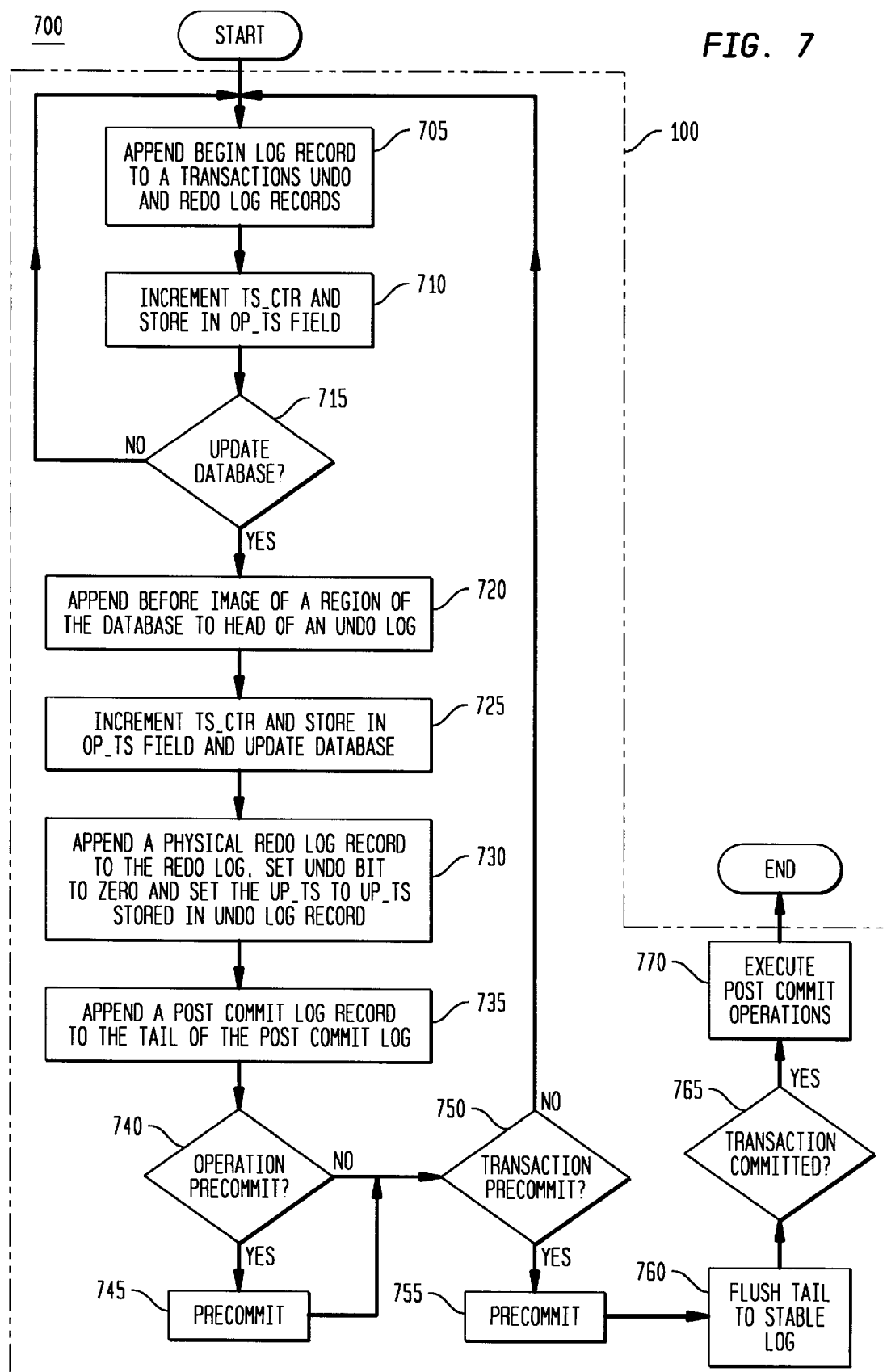
FIG. 7 illustrates a flow diagram of an exemplary method of operating the computers of FIGS. 1 through 3 to manage operations associated with the database according to the present invention.

Turning now to FIG. 7, illustrated is a flow diagram (generally designated 700) of an exemplary method of operating computer 100 during normal processing of database 140 and, more particularly, operations associated with database 140 according to principles of the present invention. An exemplary transaction begins by finding a free entry in active transaction table 155 (status equals "inactive"), constructing a tid associated with an index to the entry, and storing the tid in association with the entry. The status of the entry may be suitably changed to "active."

Upon operation begin, a begin log record may be appended to both a transaction's redo and undo logs (process step 705). ts_ctr 430 (in the transaction's active transaction table 155 entry) may be suitably incremented and this value may be stored in the op_ts field of the log record (process step 710).

If exemplary method 700 determines that an update to database 140 will occur (YES branch of decisional step 715), before the update is performed, a physical undo log record 500 containing a before image of a region of database 140 to be updated is appended to the head of the transaction's undo log 160 (process step 720). ts_ctr 430 may be suitably incremented and this value may be stored in the up_ts field of physical undo log record 160, and update database 140 (process step 725). Once the update is completed, a physical redo log record 500 containing the after image of the updated region of database 140 may be suitably appended to the transaction's redo log (e.g., miscellaneous logs 195), and the undo bit is set to ZERO and the up_ts is set to the up_ts stored in undo log record 500 for the update (process step 730). Undo and redo logs may be suitably matched as necessary.

A post-commit log record containing the description of the operation may be appended to the tail of the transaction's post-commit log (e.g., miscellaneous logs 195) (process step 735) thereby indicating an action to be taken, namely:

1. once a commit log record 600 for a transaction is stored to non-volatile memory 120 (e.g., stable log 165), if the postcommit action is registered by the transaction; or
2. once the operation pre-commits, if the post-commit action is registered by the operation.

Any locks needed for the post-commit action may be suitably obtained.

If exemplary method 700 determines that an operation precommit should occur (YES branch of decisional step 740), then a most recent active operation is precommitted (process step 745) (the phrase "most recent" is used because operations may be nested). More particularly, one or more log records in the transaction's redo log are appended to the end of the global log (tail 175), and deleted from the transaction's redo log, thereby ensuring on recovery a history for lower level structures.

Next the log records associated with post-commit actions for operations (in the transaction's post-commit log) are copied and appended to the global system log (tail 175). A commit log record 600 may also be suitably constructed and appended to the end of the global log (tail 175). op_ts may be set to ts_ctr (after suitably incrementing the same), and by setting level to the level of the operation. A logical undo description for the operation may be appended to the commit log record which is appended to the global system log (tail 175). One or more undo log records in the transaction's undo log, possibly up to and including the most recent begin operation log record (e.g., the begin operation record of the operation being precommitted), may be suitably replaced with a logical undo log record containing the undo description for the operation—deletion of the physical undo records is safe since the global log will be flushed before an associated checkpoint is complete.

The atomicity of the actions on the global system log and the undo logs are ensured by holding both a system log tail latch and an active transaction table latch for the transaction for substantially the duration of pre-commit. Once these latches are released, any post-commit actions for this operation are performed and the associated log records are deleted from the post-commit log.

If exemplary method 700 determines that a transaction precommit should occur (a transaction successfully completes execution—YES branch of decisional step 750), then a most recent active transaction is precommitted (process step 755). More particularly, one or more log records of the transaction's redo log may be suitably appended to the end of the global log (tail 175), and the redo log may be deleted. All post-commit log records associated with the transaction that are contained in its post-commit log may be suitably appended to the end of the global log (advantageously without deleting the post-commit log), and the undo log for the transaction may be deleted (As with operation precommit, this deletion is safe since the global log will be flushed before an associated checkpoint is complete). Finally, after suitably incrementing ts_ctr for the entry, a commit log record 600 with op_ts set to ts_ctr is appended to the end of the global log (tail 175), and the transaction entry's status is set to pre-committed.

Exemplary method 700 may suitably include a flush procedure that flushes one or more records of volatile tail 175 to stable log 165 (process step 760). Advantageously, each time a physical redo log record is written to non-volatile memory 120, the pages involved with the update described by the log record are marked "dirty" in dirty page table 170. Using the redo log to set bits in dirty page table 170 may suitably avoid "race" conditions that might be present if either hardware dirty page bits were used or dirty page bits were set during an update without obtaining latches. Also advantageously, each time a commit log record for a transaction is written out, the status field of the transaction entry in active transaction table 155 may be suitably set to committed. Once all the log records have been written out, temporal pointer 190 may be suitably updated to reflect the new end of the global log on disk. A latch may be suitably used to ensure that only one process executes a "flush" at a time.

Exemplary method 700 may suitably include a post-commit procedure that, upon a determination that the status of the transaction is set to committed (YES branch of decisional step 765), it executes one or more post-commit operations for the transaction, advantageously stored in a post-commit log (process step 770). Advantageously, each post-commit action is executed as if it were an operation executed during normal transaction processing. Thus, post-commit processing may suitably generate undo/redo records as usual. At the end of an operation, all log records in the transaction's redo log are appended to the global log, and an associated operation commit log record 600 with a post-commit bit ("pc_bit") set and op_ts set to ts_ctr (after suitably incrementing the same) is appended to the global log. All log records in the undo log and the post-commit operation log record in the post-commit log are then deleted, and the next post-commit log record may then be processed.

Turning now to FIG. 8, illustrated is a flow diagram (generally designated 800) of an exemplary method of operating computer 100 that includes an abort procedure according to the principles of the present invention. Exemplary method 800 may be suitably carried out by executing (traversing), in reverse order, each undo record as if execution of the same were part of a transaction. For each update, a redo record 500 with undo bit set is generated to indicate it was executed to undo an earlier operation (process step 805). The generated redo records 500 also have their up_ts set to be the same as that contained in corresponding undo log record 500 (process step 810). Each undo log record 500 is deleted when the corresponding redo log record 500 is appended to volatile tail 175 (deletion is safe since the global log will be flushed before any checkpoint is complete) (process step 815). For each operation, a new operation to undo its effects is executed, as during normal processing, the generated commit log record 600 has its undo bit set (process step 820). Once the new operation commits, the logical undo log record 500 for the operation that was undone is deleted.

Turning now to FIG. 9, illustrated is a flow diagram (generally designated 900) of an exemplary method of operating computer 100 to perform a checkpointing procedure according to the principles of the present invention. Advantageously, through the use of physical redo logging, "fuzzy" checkpointing (interfering minimally with update transactions) is provided and that does not require updates to secure page latches before updating a page, thereby allowing checkpointing to access a page even as it is being updated (in start contrast to conventional approaches). The only interference between checkpointing and transactions may be a short latch on a transaction table entry while copying out transaction-local logs.

According to the illustrated embodiment, two checkpoints 145, 150 are maintained and exemplary method 900 operates to determine, using cur_ckpt, the most recently completed database checkpoint image. Checkpointing procedure 900 then alternates to begin writing data to the other checkpoint image as described hereinbefore.

To begin, checkpointing procedure 900 writes the end of stable log 165 (temporal pointer 190) to the checkpoint image (process step 905).

Next, all "dirty" (updated—changed, modified, etc.) pages since that checkpoint image was last written are written out. In an alternate advantageous embodiment, only pages modified since the last checkpoint may be written out, this may be possible if the latest version of each page is tracked.

A list of "dirty" pages to be written out may be obtained by initializing a temporary dirty page table to a checkpoint dirty page table of the last completed checkpoint (process step 910). The list of pages is updated, checkpoint dirty page table is then initialized to dirty page table, all "1" bits in checkpoint dirty page table are set in the temporary dirty page table, and following which dirty page table is initialized to zero (process step 915). The "dirty" pages indicated by the temporary dirty page table, and then the checkpoint dirty page table, are written out to the checkpoint image (process step 920).

Dirty-page detection through the global system log, which advantageously allows only dirty pages to be written to disk during checkpointing may advantageously not require the use of a page latch during updates.

Active transaction table 155 is then checkpointed (process step 925), advantageously, also in a ping-pong fashion to alternate locations on disk. According to the illustrated embodiment, for every active transaction table entry ts-ctr, status, and all undo log records for the transaction are written out, if status is pre-committed or committed, then post-commit log records may also be written out. Each active transaction table entry is locked only while it is being read, minimizing interference with transaction processing. Finally, the global log is flushed, completing the checkpoint of active transaction table 155. This then allows the checkpoint of database 140 to be completed by updating the cur_ckpt variable on disk to point to the new checkpoint image.

In alternate embodiments, to allow pages to be flushed in a continuous manner, and to allow multiple database files to be checkpointed at once, have been developed. In all cases, a checkpoint completes only when all pages have been flushed, and a checkpoint of active transaction table 155 is thereafter completed. Of course, suitable locks are advantageously obtained to prevent multiple concurrent checkpoints on any database.

Turning now to FIG. 10, illustrated is a flow diagram (generally designated 1000) of an exemplary method of operating computer 100 to perform a database recovery procedure according to the principles of the present invention. According to the illustrated embodiment, if database 140 becomes corrupted, such as due to a system crash, active transaction table 155 is loaded from its most recently completed checkpoint (setting the tid, ts_ctr, status, undo and post-commit logs for each of the transactions) (process step 1005). For each database file 300, the most recent complete checkpoint image is then loaded into memory, and its dirty page table is zeroed (process step 1010).

Recovery procedure 1000 computes a minimum of the checkpointed end of stable log entries over all the checkpoint images (e.g., active transaction table 155 and each database file 300), and the global log is scanned from this point (process step 1015). All commit/begin log records with op_ts less than or equal to the ts_ctr in the active transaction table entry for the transaction are simply ignored; they belong to completed transactions for which only the redo log records may be relevant.

Recovery method 1000 appends a begin operation log record with an associated op_ts to the transaction's undo log (process step 1020). If the undo bit is not set (NO branch of decisional step 1025), then if the up_ts contained in the log record is greater than the ts_ctr for the active transaction table entry (YES branch of decisional step 1030), then recovery method 1000 generates and appends an undo log record containing the current contents of the updated region and with up_ts copied from the redo log record to the head of the undo log (process step 1035).

If the op_ts in the commit log record for the transaction is greater than ts_ctr for the transaction entry (YES branch of decisional step 1040), then recovery method 1000 appends the undo log record to the end of the transaction's post-commit log (process step 1045).

Each of the transaction commit and operation commit log records are performed just as during normal processing of transaction (process step 1050). The transaction commit log record updates status and deletes undo logs as during normal processing of transaction pre-commit. The operation commit log record is performed on the status, undo and post-commit logs for the transaction.

According to the illustrated embodiment, a temporary variable is maintained for each active transaction table entry, and, advantageously, in all the above cases, the temporary variable for each active transaction table entry is set to the value of op_ts/up_ts in the log record if the temporary variable value is lower. At the end of the forward pass over the global log, ts_ctr in every active transaction table entry is set to the value of temporary variable for the entry.

Recovery method 10000 scans active transaction table 155, and active transactions are aborted as described in abort Procedure 800 (process step 1055). Advantageously, for transactions with a status of committing or committed, if the undo log for the transaction is not empty, then the undo log is executed to undo partially completed post-commit actions. The remaining post-commit operations in the post-commit log for the transaction are executed as during normal post-commit processing (process step 1060).

Support for post-commit actions at the transaction and operation level is useful for handling actions that cannot be rolled back, as well as operations such as freeing of memory that cannot be rolled back. Additionally, the present embodiment minimizes log flushing by requiring only a single log flush at the end of checkpointing.

Figure 11:
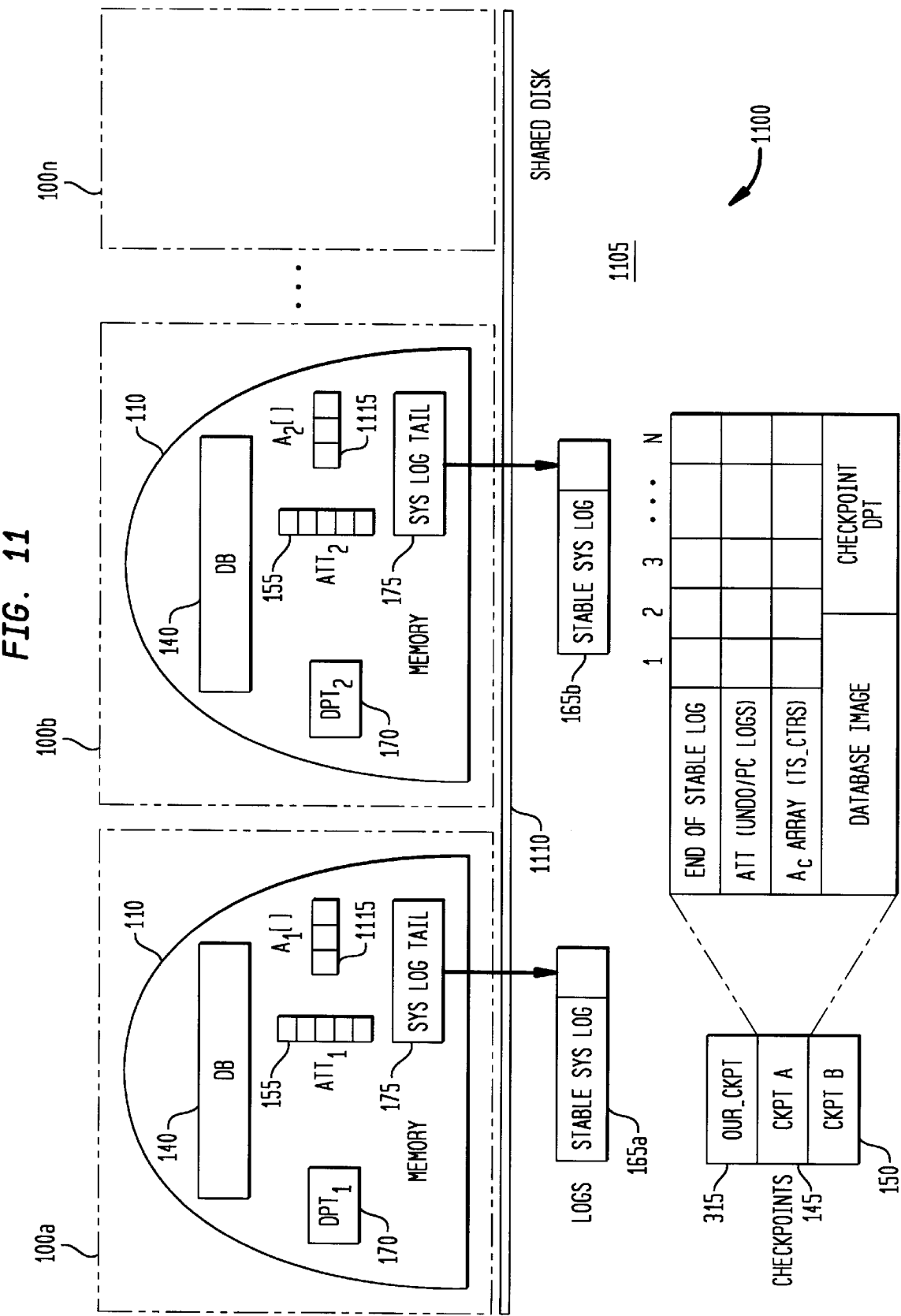
FIG. 11 illustrates a block diagram of an exemplary computer system that employs a suitable shared-disk environment within which the principles of the present invention may be implemented and operated.

FIG. 11 illustrates a block diagram of an exemplary computer system (generally designated 1100) employing a suitable shared-disk environment within which the principles of the present invention may be implemented and operated. According to the illustrated shared disk embodiment, a shared disk 1105 is directly not associated with a computer (e.g., server) and each site (computer 100) has access to shared disk 1105 over a fast network connection 1110 (in alternate embodiments, shared disk 1105 may be suitably be associated with a computer).

According to the illustrated embodiment, each site maintains its own copy of database 140 and its own global system log (log tail 175 in association with stable log 165) on disk 1105. Each site 100 may suitably obtain a lock from a global lock manager ("GLM") (the function of the lock manager may be distributed for speed and reliability). For purposes of illustration only, computer system 1100 is assumed first-in-first-out.

The exemplary embodiment broadcasts log records generated at a first site 100b to all other sites 100 so updates may be carried out at each locally—because log records are shipped, there is no need to ship pages. Every time a site 100 obtains a region lock, the most recent version of the region is therefore accessed at the site 100, thereby ensuring that each time a site 100 obtains a lock (whether an operation lock or a region lock). Advantageously, all log records generated by all operations that held the same lock in a conflicting mode have been applied to the local page images.

Each exemplary site 100 includes a global time stamp counter ("TS_ctr"), and a time stamp obtained from this counter is stored in each physical redo log record for an update. An array of TS_ctrs (one TS_ctr per site 100), Aj 1115, is maintained in memory, Aj[i] storing the time stamp of the latest update from site i that has been applied to the database at site j. Separate undo and redo logs are also advantageously maintained for every transaction as described hereinabove and according to the '259 Application. Each site maintains also advantageously maintains its own version of dirty page table 170, active transaction table 155 and system log tail 175.

Exemplary shared disk 1105 illustratively includes a single pair of checkpointed images 145, 150, each of which consists of an image of the database, a copy of a dirty page table and, for every site 100, (1) a temporal pointer to the point in site 100's system log from which the system log must be scanned during recovery; (2) TS_ctr, following which redo log records from site 100 advantageously are applied to the database (collectively, these counters are referred to as "AC"); and (3) a copy of active transaction table 155 at site 100 (including undo and post-commit logs).

Advantageously a local lock manager ("LLM") at a site stores a point in the system log with each lock as in the client-server embodiment of the '259 Application. Both the LLM and GLM also store a time stamp with each region lock, and the GLM notes which site most recently held the lock.

Concerning log records, every time a physical redo log record is moved from a transaction's local redo log to the system log, TS_ctr is suitably incremented and stored in the log record. The time stamps are used to order (sort) log records that describe conflicting updates.

With respect to system log flushes, when the system log at site i is flushed to stable storage, each redo log record which has hit the disk is also broadcast to the other sites. The sending site i, also sets Ai[i] to the time stamp in the log record. Flushing of a sequence of log records is completed once every log record has been written to disk 1105 as well as sent to the remaining sites 100.

Concerning updates, a site 100a processes an update broadcast to it from another site 100n as follows: upon receiving a broadcast log record, the site 100n applies the update to its local copy of the affected page, and sets the appropriate bits in its dirty page table 170. After updating the appropriate pages, the site sets Aj[i] to the time stamp contained in the update (e.g., redo log record).

With respect to lock releases, advantageous lock managers aid correctness (accuracy) in two ways:

1. The current local end of log is noted when an operation or a region lock is released, and the LLM ensures that the log is flushed to this point before releasing the lock from the site. This aids in recovery by ensuring that history is repeated, and when lower level locks are released, the logical undo actions which accompany the higher level locks have made it to disk. Since logs are broadcast on flush, it helps ensure that another site will receive the necessary log records before getting the same lock in a conflicting mode. Note that this could require no log flushes if the log records have already been flushed earlier due to another lock release or some other transaction's commit.

2. When a transaction releases a region lock, the time stamp for the lock is set to the current value of TS_ctr at the site. When this lock is called back by the GLM, this value is also sent and is associated with the lock by the GLM. When received by another site, the time stamp is used to ensure that log records for conflicting actions covered by this lock have increasing time stamp values. As an optimization, the site identifier can also be sent with the lock to the GLM.

Concerning lock acquisition, when a site receives a region lock from the GLM, it suitably increments its own TS_ctr to be the maximum of its current TS_ctr and the time stamp associated with the lock (received from the GLM). Further, the lock is granted to a local transaction (operation) only after all outstanding (unapplied) updates at the time of acquiring the lock have been applied to the page. This is to ensure that data accessed at a site is always the most recent version of the data. According to an advantageous embodiment, if a site 100 identifier is provided with the lock by the GLM, it suffices to process log records up to (and including) the log record from the site 100 with the time stamp provided.

With respect to checkpoints 145, 150, checkpointing is initiated by a site 100, which coordinates the operation. The checkpointing operation consists, as for the illustrated embodiments set forth hereinabove, (1) writing the database image by the coordinating site 100, 2) writing the active transaction table 155 at each site 100, and 3) finally committing the checkpoint 145, 150.

More particularly, coordinating site 100 communicates the beginning of checkpointing to the other sites 100, at which time all other sites 100 zero their dirty page table 170, and report their current end of stable log 165 values. Note that zeroing dirty page table 170 and recording the end of stable log 165 is done atomically with respect to flushes, since the flush latch controls dirty page table 170. The coordinator applies all outstanding updates, then atomically (with respect to processing further log records and while holding the flush latch) records its end of stable log, notes AC from it's own Aj, and checkpoint dirty page table from its dirty page table, and then zeroes its own dirty page table. The coordinator then writes to the checkpoint image the checkpoint dirty page table, the end of stable logs for each site, and the time stamp array AC.

Coordinating site 100 applies outstanding updates before noting checkpoint dirty page table. AC ensures that 1) updates preceding end of stable log 165 reported by other sites 100 have been applied to the database pages, and 2) the pages are marked dirty in checkpoint dirty page table and thus, it is safe to zero dirty page tables at sites when end of stable log 165 is noted. Also, since each site 100 notes end of stable log 165 independently, it is possible that for a redo log record after end of stable log 165 at one site 100, a conflicting redo log record generated after it may be before end of stable log 165 noted at a different site. As a result, during restart recovery, applying every update after end of stable log 165 in the system log for a site 100 could result in the latter update being lost. Storing AC in the checkpoint 145, 150 and during restart recovery, applying only redo records at site 100 whose time stamps are greater than AC[i] eliminates the above problem since time stamps for both updates would be smaller than the corresponding TS_ctr values for the sites 100 in AC.

Next, the database image is written out by coordinating site 100 as set forth hereinabove, writing out not only pages dirty in this checkpoint interval (in checkpoint dirty page table), but also pages dirtied in the previous checkpoint interval (in the checkpoint dirty page table stored in the previous checkpoint).

Once coordinating site 100 has written out the database image, it instructs each site to write out its active transaction table 155. Note that, writing active transaction table 155 at a site 100 causes the system log at the site 100 to be flushed. Multiple sites 100 can be concurrently writing out their active trans action tables 155.

Once every site has reported to coordinating site 100 that its active transaction table 155 has been written out, the database checkpoint is committed by toggling cur_ckpt as set forth hereinabove.

Concerning recovery, after database 140 corruption at some site 100, recovery may be suitably performed by an arbitrary site 100 of system 1100. The database image and the checkpointed time stamp array AC are read, and for each site, the active transaction table 155 and the end of stable log 165 recorded in the checkpoint are read. Redo log records in the system logs for the various sites 100 are then applied to the database image by concurrently scanning the various system logs. Each site 100's system log is scanned in parallel, starting from the end of stable log 165 recorded for the site 100 in the checkpoint. At each point, if the next log record to be considered in any of the system logs is not a redo log record, then it is processed and active transaction table 155 for its site (status, undo and post-commit logs) is modified as set forth hereinbelow. On the other hand, if the next record to be considered in all the system logs is a redo log record, then the log record considered next is the one (among all the system logs on disk being considered) with the lowest time stamp value. For every redo log record encountered in the system log for a site 100 with a time stamp greater than AC[i], the update is applied and the affected pages are marked as dirty in site 100's dirty page table 170.

Once all the system logs have been scanned, TS_ctr at site 100 is set to the largest time stamp contained in a redo log record. In-progress and post-commit operations in active transaction tables 155 for the various sites 100 are then rolled back and executed, respectively, at site 100 against the database at site 100, beginning with level L1 and then considering successive levels L2, L3 and so on. When an operation in an Active transaction table entry for a site 100 is being processed, actions are performed on the undo, redo and post-commit logs for the entry. Furthermore, when an operation pre-commits/aborts, log records from the redo log are appended to the system log for the site and the time stamp for each redo log record appended is obtained by incrementing TS_ctr at site 100.

Finally, every sites' system logs are flushed causing appropriate pages in the coordinating site 100's dirty page table 170 to be marked dirty (updates are not broadcast, however). The database image at every site is set equal to the database image at coordinating site 100's, dirty page table 170 for each site 100 is copied from dirty page table 170 at coordinating site 100, and recovery is completed.

It should be noted that the illustrated recovery approach may also be suitably extended to deal with site 100 failure without performing a complete system 1100 restart, so long as the GLM data has not been lost, or can be regenerated from the other sites. If this is not the case, a full system recovery may be performed instead. Recovery from site failure, as with regular system recovery, has a redo pass, followed by rollback of in-progress operations and execution of post-commit operations.

From the above, it is apparent that the present invention introduces the broad concept of providing an active database stored in volatile memory that can be revised quickly, but that is recoverable should it become corrupted (possibly by virtue of being stored in the volatile memory). The present invention provides a system for, and method of, restoring an active database and a computer system containing the same. The active database has multiple checkpoints and a stable log having a tail stored in the volatile memory for tracking revisions to the active database to allow corresponding revisions to be made to the multiple checkpoints. An exemplary system includes: (1) a checkpoint determination controller that determines which of the multiple checkpoints is a most recently completed checkpoint and copies the most recently completed checkpoint to the volatile memory to serve as an unrevised database for reconstructing the active database and (2) a revision application controller that retrieves selected ones of the revisions from the stable log and the tail and applies the revisions to the unrevised database thereby to restore the active database. In an advantageous embodiment, the applied revisions include log records at an operation level (lower level of abstraction than transactions), and the revision application controller, using memory locks while restoring the active database, releases ones of the memory locks as a function of applying ones of the log records.

Although the present invention has been described in detail, those skilled in the art should understand that they can make various changes, substitutions and alterations herein without departing from the spirit and scope of the invention in its broadest form.

What is claimed is:

1. For use with an active database stored in volatile memory for direct revision thereof, said active database having multiple checkpoints and a stable log, having a tail stored in said volatile memory, for tracking revisions to said active database to allow corresponding revisions to be made to said multiple checkpoints, said active database subject to corruption, a system for restoring said active database, comprising:

a checkpoint determination controller that determines which of said multiple checkpoints is a most recently completed checkpoint and copies said most recently completed checkpoint to said volatile memory to serve as an unrevised database for reconstructing said active database; and a revision application controller that retrieves selected ones of said revisions from said stable log and said tail and applies said revisions to said unrevised database thereby to restore said active database.

2. The system as recited in claim 1 wherein said applied revisions include log records at an operation level, and said revision application controller, using memory locks while restoring said active database, releases ones of said memory locks as a function of applying ones of said log records.

3. The system as recited in claim 1 wherein said database is associated with each of a redo log and an undo log.

4. The system as recited in claim 3 wherein at least a portion of said redo log is appended to said tail.

5. The system as recited in claim 1 wherein said multiple checkpoints are checkpointed alternately.

6. The system as recited in claim 1 wherein said active database and said multiple checkpoints each contain an active transaction table, said checkpoint determination controller copying said active transaction table from said most recently completed checkpoint to said volatile memory.

7. The system as recited in claim 1 wherein said stable log and said tail cooperate to form a global log, said revision application controller applying said revisions as a function of a temporal pointer associated with said global log.

8. The system as recited in claim 1 wherein said revision application controller retrieves revisions from said stable log and said tail that were not made to said most recently completed checkpoint.

9. The system as recited in claim 1 wherein said multiple checkpoints and said stable log are stored on a nonvolatile storage device.

10. The system as recited in claim 1 wherein said active database further has an undo log for tracking revisions to be undone in said active database, said revision application controller retrieving said selected ones of said revisions as a function of a content of said undo log.

11. For use with an active database stored in volatile memory for direct revision thereof, said active database having multiple checkpoints and a stable log, having a tail stored in said volatile memory, for tracking revisions to said active database to allow corresponding revisions to be made to said multiple checkpoints, said active database subject to corruption, a method of restoring said active database, comprising the steps of:

determining which of said multiple checkpoints is a most recently completed checkpoint;

copying said most recently completed checkpoint to said volatile memory to serve as an unrevised database for reconstructing said active database;

retrieving selected ones of said revisions from said stable log and said tail; and applying said revisions to said unrevised database thereby to restore said active database.

12. The method as recited in claim 9 wherein said applied revisions include log records at an operation level, said method further including the steps of:

using memory locks while restoring said active database, and releasing ones of said memory locks as a function of applying ones of said log records.

13. The method as recited in claim 11 wherein said database is associated with each of a redo log and an undo log.

14. The method as recited in claim 13 wherein at least a portion of said redo log is appended to said tail.

15. The method as recited in claim 11 further comprising the step of alternately checkpointing said multiple checkpoints.

16. The method as recited in claim 11 wherein said active database and said multiple checkpoints each contain an active transaction table, said method further comprising the step of copying said active transaction table from said most recently completed checkpoint to said volatile memory.

17. The method as recited in claim 11 wherein said stable log and said tail cooperate to form a global log, said revision application controller applying said revisions as a function of a temporal pointer associated with said global log.

18. The method as recited in claim 11 further comprising the step of retrieving revisions from said stable log and said tail that were not made to said most recently completed checkpoint.

19. The method as recited in claim 11 wherein said multiple checkpoints and said stable log are stored on a nonvolatile storage device.

20. The method as recited in claim 11 wherein said active database further has an undo log for tracking revisions to be undone in said active database, said method further comprising the step of retrieving said selected ones of said revisions as a function of a content of said undo log.

21. A computer system, comprising:

volatile memory that is capable of containing an active database therein to allow said active database to be directly revised, said active database subject to corruption;

at least one nonvolatile storage unit, coupled to said volatile memory, that is capable of containing multiple alternative checkpoints of said active database and a stable log, having a tail stored in said volatile memory, for tracking revisions to said active database to allow corresponding revisions to be made to said multiple alternative checkpoints; and a processor, coupled to said volatile memory and said at least one nonvolatile storage device, that is operable to execute routines for revising said active database and for restoring said active database if said active database is corrupted, said routines for restoring said active database comprising:

a checkpoint determination routine that determines which of said multiple alternative checkpoints is a most recently completed checkpoint and copies said most recently completed checkpoint from said at least one nonvolatile storage device to said volatile memory to serve as an unrevised database for reconstructing said active database, and a revision application routine that retrieves selected ones of said revisions from said stable log and said tail and applies said revisions to said unrevised database thereby to restore said active database.

22. The computer system as recited in claim 21 wherein said applied revisions include log records at an operation level, and said revision application controller, using memory locks while restoring said active database, releases ones of said memory locks as a function of applying ones of said log records.

23. The computer system as recited in claim 21 wherein said database is associated with each of a redo log and an undo log.

24. The system as recited in claim 23 wherein at least a portion of said redo log is appended to said tail.

25. The computer system as recited in claim 21 wherein said active database and said multiple alternative checkpoints each contain an active transaction table, said checkpoint determination routine copying said active transaction table from said most recently completed checkpoint to said volatile memory.

26. The computer system as recited in claim 21 wherein said stable log and said tail cooperate to form a global log, said revision application controller applying said revisions as a function of a temporal pointer associated with said global log.

27. The computer system as recited in claim 21 wherein said revision application routine retrieves revisions from said stable log and said tail that were not made to said most recently completed checkpoint.

28. The computer system as recited in claim 21 wherein said active database further has an undo log for tracking revisions to be undone in said active database, said revision application routine retrieving said selected ones of said revisions as a function of a content of said undo log.

29. The computer system as recited in claim 21 wherein said stable log contains an indication of an extent to which said revisions are committed to said multiple alternative checkpoints.

* * * * *